US011012905B2

(12) United States Patent
Tabet et al.

(10) Patent No.: US 11,012,905 B2
(45) Date of Patent: May 18, 2021

(54) WIRELESS COMMUNICATION USING AN ANCHOR CARRIER AND FLEXIBLE DATA CARRIERS

(71) Applicant: Apple Inc., Cupertino, CA (US)

(72) Inventors: Tarik Tabet, Los Gatos, CA (US); David Boettger, San Jose, CA (US)

(73) Assignee: Apple Inc., Cupertino, CA (US)

(*) Notice: Subject to any disclaimer, the term of this patent is extended or adjusted under 35 U.S.C. 154(b) by 3 days.

(21) Appl. No.: 15/827,143

(22) Filed: Nov. 30, 2017

(65) Prior Publication Data

US 2018/0176848 A1 Jun. 21, 2018

Related U.S. Application Data

(60) Provisional application No. 62/435,999, filed on Dec. 19, 2016.

(51) Int. Cl.
*H04W 36/24* (2009.01)
*H04W 36/06* (2009.01)
*H04W 36/30* (2009.01)
*H04W 36/36* (2009.01)
*H04W 72/08* (2009.01)
*H04W 72/10* (2009.01)
*H04W 72/04* (2009.01)
*H04W 36/08* (2009.01)
*H04W 76/15* (2018.01)

(52) U.S. Cl.
CPC ......... *H04W 36/06* (2013.01); *H04W 36/30* (2013.01); *H04W 36/36* (2013.01); *H04W 72/048* (2013.01); *H04W 72/08* (2013.01); *H04W 72/10* (2013.01); *H04W 36/08* (2013.01); *H04W 72/0453* (2013.01); *H04W 76/15* (2018.02)

(58) Field of Classification Search
None
See application file for complete search history.

(56) References Cited

U.S. PATENT DOCUMENTS

| 8,526,400 | B2 | 9/2013 | Tong et al. |
| 8,767,641 | B2 | 7/2014 | Chen et al. |
| 9,485,755 | B2 | 11/2016 | Tee et al. |
| 2016/0278013 | A1* | 9/2016 | Shellhammer .... H04W 52/0225 |
| 2017/0150439 | A1* | 5/2017 | Sasadai ............... H04L 67/1074 |
| 2017/0238284 | A1* | 8/2017 | Tseng ................ H04W 72/0453 370/329 |
| 2017/0251455 | A1 | 8/2017 | Shin et al. |
| 2018/0014143 | A1* | 1/2018 | Rico Alvarino .... H04W 72/005 |

(Continued)

FOREIGN PATENT DOCUMENTS

| WO | WO2017069474 | 4/2017 |
| WO | WO2017135419 | 8/2017 |

*Primary Examiner* — Ayaz R Sheikh
*Assistant Examiner* — Sori A Aga
(74) *Attorney, Agent, or Firm* — Kowert, Hood, Munyon, Rankin & Goetzel, P.C.

(57) ABSTRACT

This disclosure relates to techniques for supporting wireless communication using an anchor carrier and data carriers. A wireless device may attach to a cellular network via an anchor carrier. The wireless device may receive data transfer scheduling information from the cellular network via the anchor carrier. The data transfer scheduling information may indicate a data carrier on which data transfer is scheduled. The wireless device may receive data for the data transfer via the data carrier.

20 Claims, 6 Drawing Sheets

(56) References Cited

U.S. PATENT DOCUMENTS

| | | | |
|---|---|---|---|
| 2018/0063841 A1* | 3/2018 | Song | H04W 48/06 |
| 2018/0124784 A1* | 5/2018 | Kumar | H04W 52/0206 |
| 2018/0234916 A1* | 8/2018 | Song | H04W 48/18 |
| 2019/0208503 A1* | 7/2019 | Li | H04W 72/0453 |

* cited by examiner

WIRELESS COMMUNICATION USING AN ANCHOR CARRIER AND FLEXIBLE DATA CARRIERS

PRIORITY INFORMATION

This application claims priority to U.S. provisional patent application Ser. No. 62/435,999, entitled "Wireless Communication using an Anchor Carrier and Flexible Data Carriers," filed Dec. 19, 2016, which is hereby incorporated by reference in its entirety as though fully and completely set forth herein.

TECHNICAL FIELD

The present application relates to wireless communication, including to techniques for wireless communication that utilize an anchor carrier and flexible data carriers.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. Therefore, improvements in the field are desired.

SUMMARY

Embodiments are presented herein of, inter alia, systems, apparatuses, and methods for performing wireless communication using an anchor carrier that can opportunistically schedule data carriers for wireless devices based on the class of the service/application on behalf of which the wireless communication is being performed, the class of the wireless device, and/or any of various other characteristics.

As noted above, the number of use cases for different classes of wireless devices with widely variable capabilities and usage expectations are growing. Further, the communication needs of even a single wireless device may, at least in some instances, vary over time. For example, at certain times a wireless device might communicate minimal if any data, while at other times the wireless device might communicate large amounts of data.

In view of such variable communication characteristics, wireless devices and cellular networks generally may benefit from increasing the flexibility of the framework for providing data carriers, for example to expand the range of data communication characteristics that can be accommodated in a network. This disclosure presents various techniques for a cellular base station and wireless device to communicate in such a manner.

For example, according to at least some of the techniques described herein, a wireless network may provide an anchor carrier that can provide basic functions, and that can schedule use of any of a potentially wide range of possible data carriers for data communications with wireless devices serviced by the wireless network. The data carriers may range from low-power, narrowband carriers that may be suitable for infrequent and/or very low data rate communication, to high-power, wideband carriers that may be suitable for frequent and/or very high data rate communication, among various possibilities.

Such techniques may benefit wireless devices, at least according to some embodiments, e.g., by allowing them to more finely adjust their baseband operations for the type of communication being performed, and thereby to operate in a potentially more power-efficient manner. Such techniques may also or alternatively benefit cellular networks generally, e.g., as more precise allocation of bandwidth resources to the intended uses of device served by the network may result in more efficient overall use of radio resources, processing resources, memory resources, and/or other resources.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
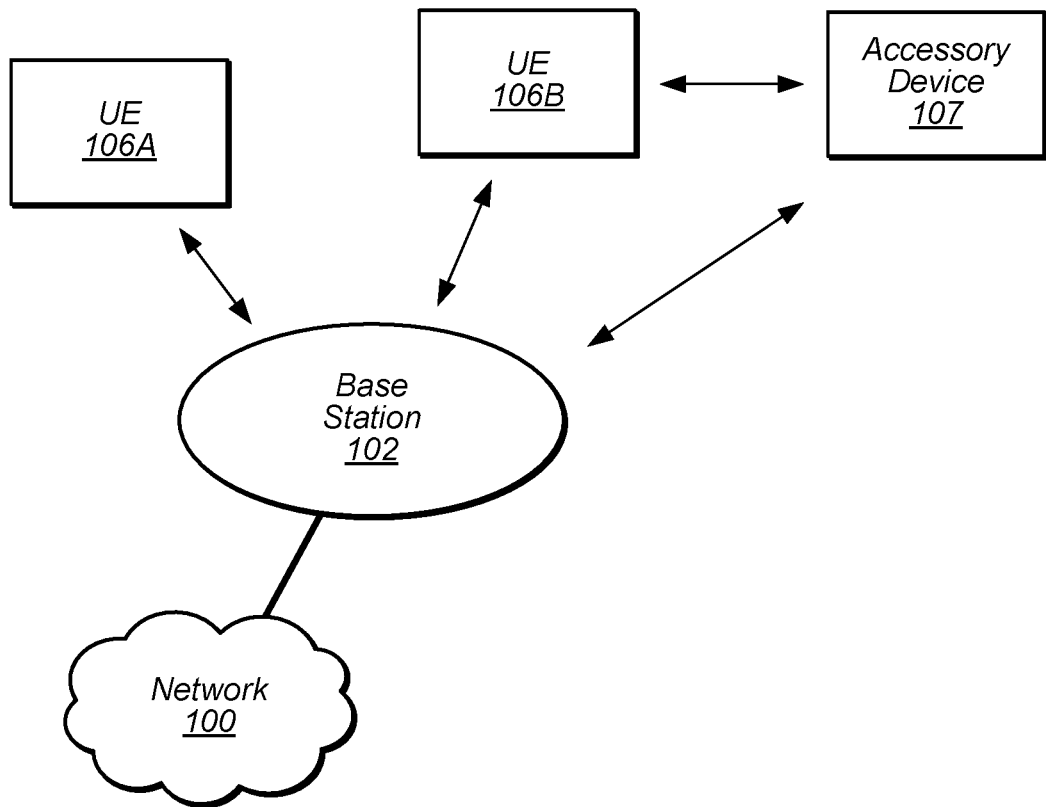
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
IoT: Internet of Things
NB: Narrowband
WB: Wideband
EC: Extended Coverage
PSM: Power Saving Mode
eDRX: Extended Discontinuous Reception Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/ receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
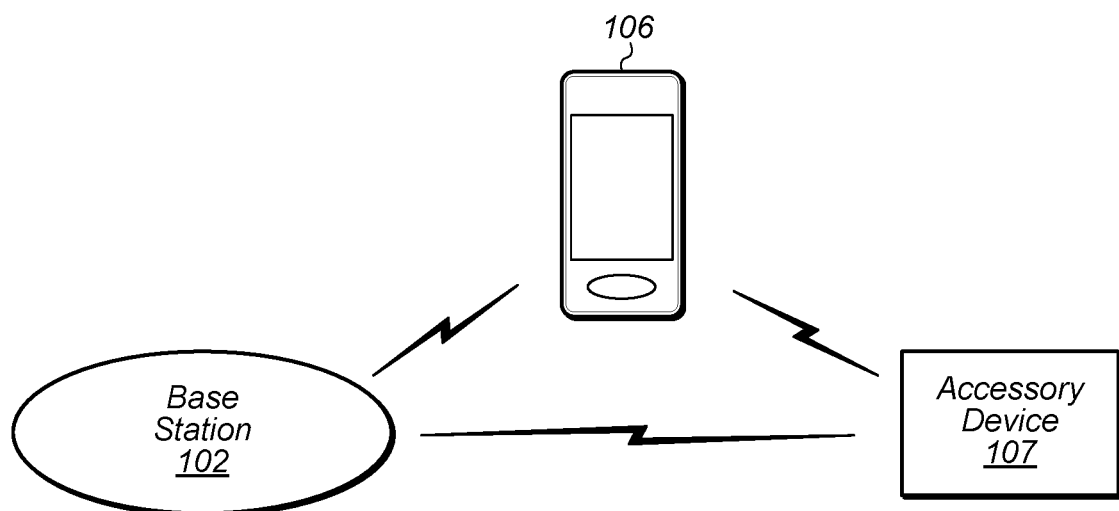
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (e.g., LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, WiMAX, LTE, LTE-A, WLAN, Bluetooth, one or more global navigational satellite systems (GNSS, e.g., GPS or GLONASS), one or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communication abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (processing elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, have a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited or no cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
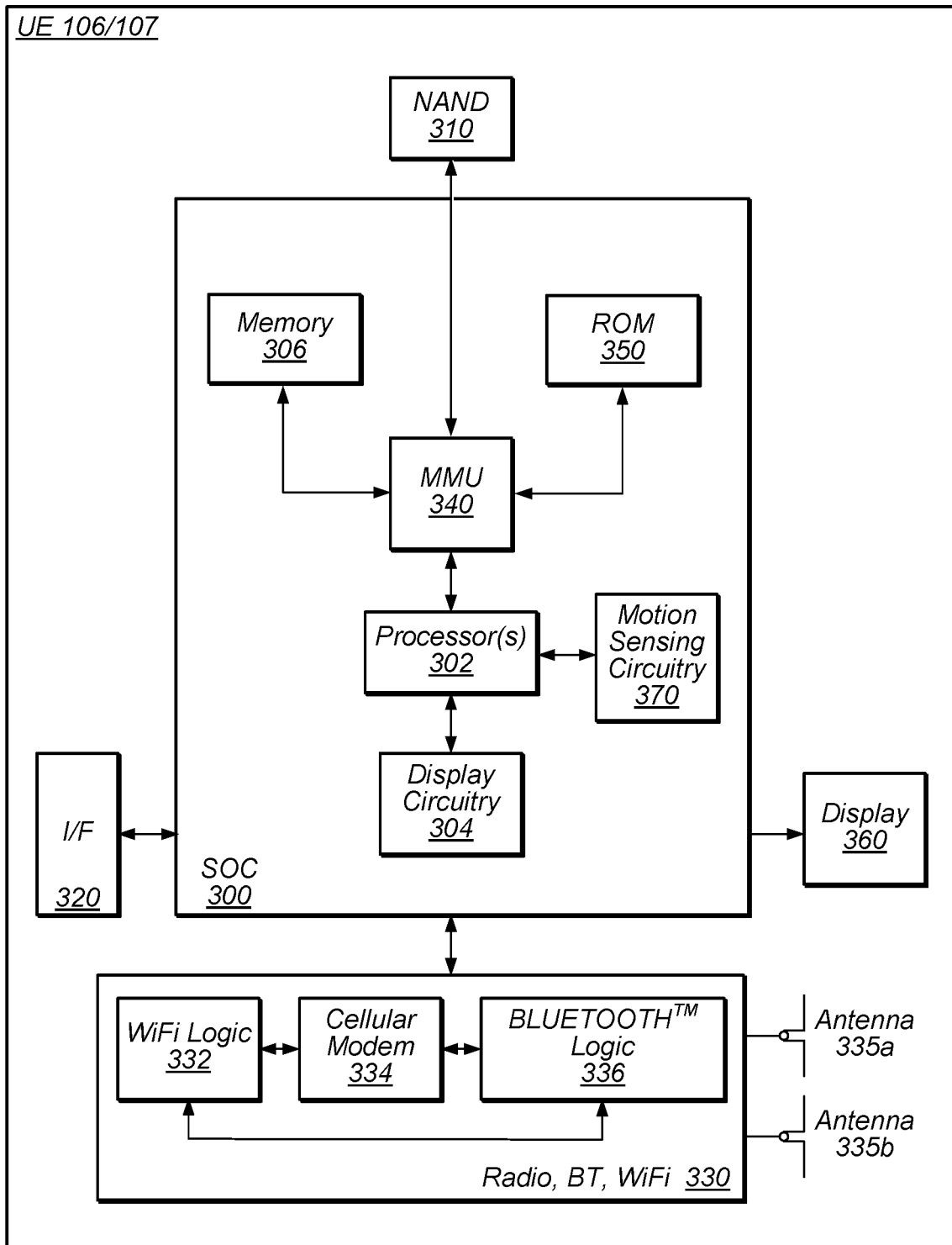
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335*a* and 335*b*, for performing wireless communication with base stations and/or other devices. For example, the UE device 106/107 may use antennas 335*a* and 335*b* to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
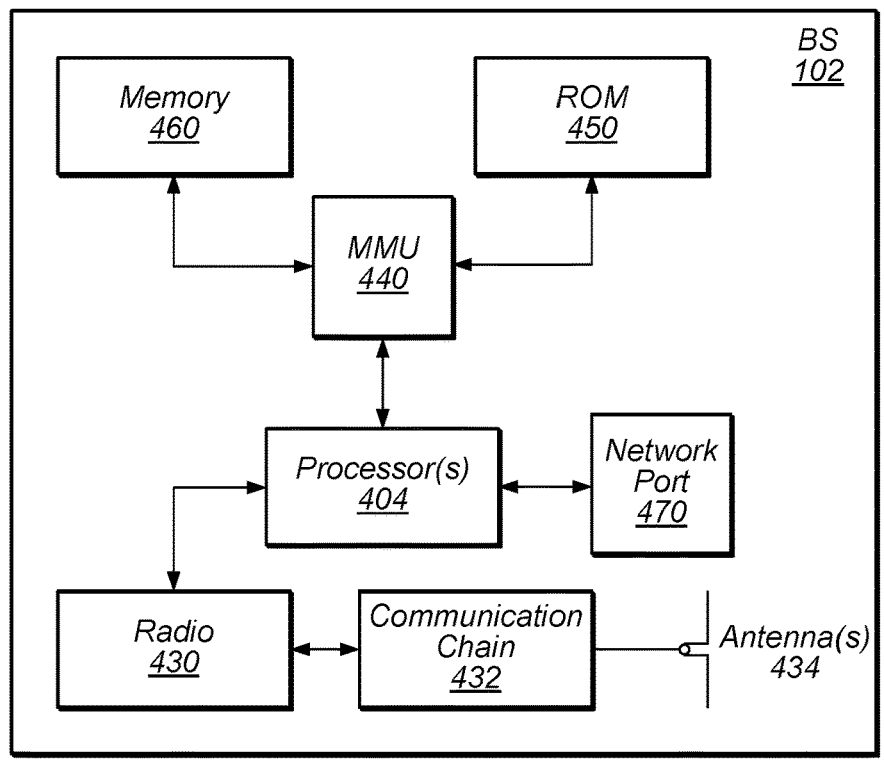
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
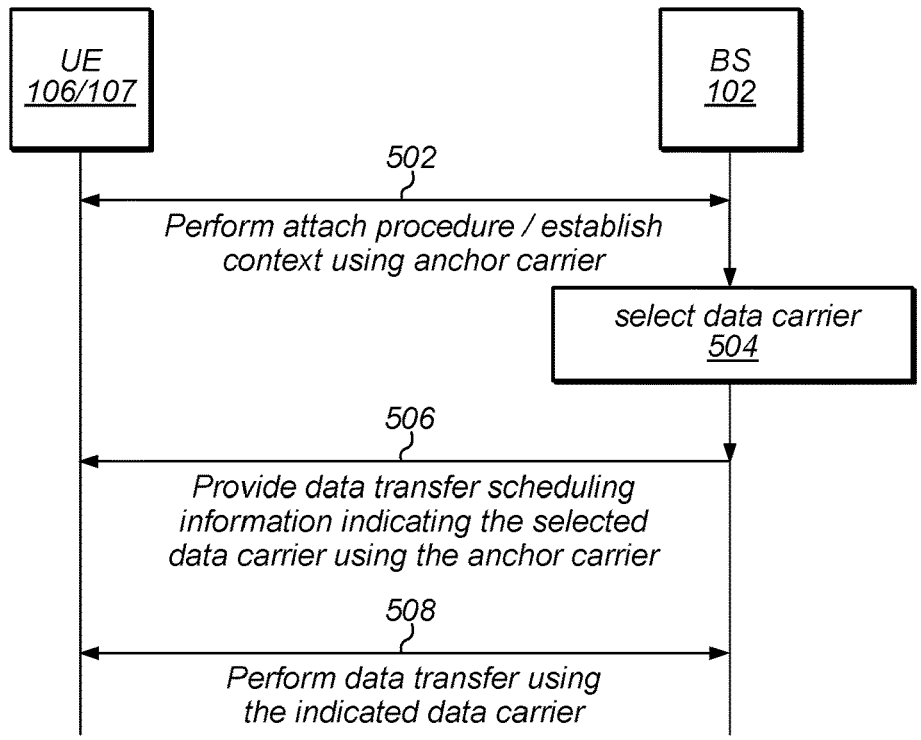
FIG. 5 is a communication flow diagram illustrating an exemplary method for performing wireless communication using an anchor carrier and data carriers, according to some embodiments.

FIG. 5—Communication Flow Diagram

As cellular communication technologies evolve, an increasing number of cellular communication capable devices are expected to be deployed. One of the reasons for the continuing increase in the numbers of devices includes the development and spread of devices performing machine type communication (MTC). Such devices, which may include stationary deployed devices, wearable devices, and/or other devices forming part of the "Internet of Things", may commonly be designed to perform frequent and/or periodic small data transmissions.

In view of the potentially more limited expected usage scenarios for such devices, devices primarily expected to perform MTC may commonly be lower-complexity devices than many other common cellular devices (e.g., handheld cellular phones, etc.), for example to reduce the size, cost of manufacture, and/or cost to the consumer of such devices. Accordingly, in many instances the communication capability (e.g., number of transmit/receive antennas, number of RF chains, transmission power, battery capability, communication range, transmit/receive peak data rates, supported bandwidth, etc.) of such devices may be relatively limited. For example, many such devices may be considered link budget limited devices.

This may present difficulties in a wireless communication system that primarily supports wireless devices with greater communication capability. Accordingly, at least some wireless communication technologies are being revised and/or developed in a manner to support a greater range of device- and communication-types (e.g., including link budget limited devices, non-link budget limited devices, and/or other types of devices).

As one possibility for providing a flexible framework capable of supporting a greater range of device- and communication-types, a wireless communication system could be designed that utilizes an "anchor" carrier that supports very low complexity devices and low power consumption while offering a variety of data carriers ranging from additional slim carriers to full-featured carriers capable of providing high throughput and/or high quality of service (QoS) characteristics.

Accordingly, FIG. 5 is a communication flow diagram illustrating a method for performing wireless communication using an anchor carrier and a separate data carrier, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as a UE 106 or 107 illustrated in and described with respect to FIGS. 1-3 and/or a base station 102 such as illustrated in and described with respect to FIGS. 1, 2, and 4, or more generally in conjunction with any of the computer systems or devices shown in the above Figures, among other devices, as desired. Note that while at least some elements of the method of FIG. 5 are described in a manner relating to the use of communication techniques and/or features associated with LTE and/or 3GPP specification documents, such description is not intended to be limiting to the disclosure, and aspects of the method of FIG. 5 may be used in any suitable wireless communication system, as desired. As shown, the method may operate as follows.

In 502, the wireless device may perform an attach procedure and/or more generally establish context information with a cellular base station. The attachment/context establishment may be performed via an anchor carrier provided by the base station. The anchor carrier may be any of a variety of types of carrier. As one possibility, the anchor carrier may be a narrowband internet of things (NB-IoT) carrier. Such a carrier may utilize a relatively narrow bandwidth (e.g., 180 KHz, according to some embodiments) and may include any a variety of power consumption reducing features. Providing such a "slim" carrier as an anchor carrier may allow wireless devices of many device types to minimize power consumption when not actively performing data transfers, while still retaining the flexibility to schedule data carriers with performance characteristics appropriate to a wide array of types of devices and data transfers, at least according to some embodiments. However, any number of other carrier types (e.g., including wider band/fuller featured carrier types, alternative slim carrier types, variants on an NB-IoT carrier, etc.) may alternatively be used for the anchor carrier, as desired.

The wireless device may provide certain information to the cellular base station that may assist with data carrier selection for the wireless device, e.g., as part of the attach procedure, or otherwise establishing context information, or at any of various other possible times. For example, the wireless device may provide device category information (e.g., according to 3GPP device categories and/or according to any of various other possible device categorization schemes) for the wireless device to the cellular base station. The wireless device may also or alternatively at some point provide a request to perform a data transfer, which may potentially include information regarding service type, application type, data type, Quality of Service requirements, and/or other information regarding data characteristics for the requested data transfer as well as link metrics.

In 504, the base station may select a data carrier (or multiple data carriers) for the wireless device, e.g., for a data tranfer initiated by the wireless device, or for a data transfer initiated on the network side. The data carrier(s) may be selected from multiple possible types of data carrier. In some instances, channel quality between the base station and the wireless device may be considered when selecting the data carrier. Additionally or alternatively, according to some embodiments, the carrier type of the data carrier may be selected based at least in part on the device category of the wireless device and/or the data type of the data to be communicated via the data carrier. For example, any or all of less complex device categories, lower data throughput requirements, lower quality of service (QoS) requirements, and/or preference for lower power consumption may bias the carrier type selection of the data carrier towards a lower power, lower throughput, and/or relatively narrowband type of data carrier, such as a NB-IoT carrier. Similarly, any or all of more complex device categories, higher data throughput requirements, higher quality of service (QoS) requirements, and/or lower emphasis on lower power consumption may bias the carrier type selection of the data carrier towards a higher power, higher throughput, and/or relatively wideband type of data carrier, such as a 3GPP LTE or 5G carrier, or even multiple high performance carriers (e.g., for carrier aggregation). Any number of intermediate types of data carriers, e.g., which may be selected based on intermediate device and/or data type characteristics, are also possible. For example, in some instances, a further enhancements to machine type communication (FeMTC) carrier may be a candidate for selection as the data carrier. Still further types of data carriers are also possible. It should be noted that, at least according to some embodiments, any switch between carriers (for example from NB-IoT to FeMTC and vice-versa) may be seamless at the protocol level (e.g., a well defined procedure that guarantees data continuity (e.g., IP continuity) may be provided).

In 506, the base station may provide data transfer scheduling information to the wireless device. The data transfer scheduling information may be provided using the anchor carrier, according to some embodiments. The data transfer scheduling information may indicate the selected data carrier. For example, bandwidth and waveform information for the selected data carrier may be indicated as part of the data transfer scheduling information. Note that in some embodiments, (e.g., to reduce the burden on the anchor carrier), at least some scheduling information for the data transfer may not be provided using the anchor carrier, and may for example be provided via the data carrier. For example, the data carrier might include a control channel that may indicate the physical resources and/or the nature of the data carrier that are assigned to the wireless device for the data transfer, as one possibility. For example, the data transfer scheduling information could include a notification to use an FeMTC carrier, as one possibility. Alternatively, the anchor carrier could also be used to schedule resource assignments for the data carrier(s), if desired.

In 508, data transfer may be performed using the indicated data carrier. The data transfer may include uplink and/or downlink communication (e.g., possibly depending on the capabilities of the selected data carrier(s), the nature of the data transfer, etc.). Thus, the wireless device may receive data and/or may transmit data via resources indicated in accordance with resource assignment information provided by the network.

Note that, at least according to some embodiments, the wireless device may disconnect/detach from the anchor carrier and connect/attach to the data carrier to perform the data transfer. Similarly, the wireless device may disconnect/detach from the data carrier and connect/attach to the anchor carrier once the data transfer is complete. In other words, the wireless device may leave the anchor carrier when performing data transfers, and return to the anchor carrier once any data transfers are complete, at least according to some embodiments. Note that, at least in some instances, the network may retain context information for the wireless device (e.g., the wireless device may remain attached to the network) regardless of whether the wireless device is connected to the anchor carrier or a data carrier, e.g., to allow for smoother transitions between carriers. In such instances, the context information may be saved in the core network and/or at the base station(s) providing the carrier(s), among various possibilities.

Note that at least in some instances, the wireless device may be configured to dynamically modify at least some of its operating characteristics depending on to which carrier (or possibly more generally carrier type) it is attached. For example, according to some embodiments, the wireless device may include an anchor baseband subsystem and a full baseband subsystem, and may toggle between operating the anchor baseband subsystem and the full baseband subsystem at different times (e.g., depending on whether the wireless device is connected to the anchor carrier or connected to a data carrier, as one possibility). The full baseband subsystem may include additional functionality that is powered off when operating just the anchor baseband subsystem.

Thus, for example, the wireless device may operate the anchor baseband subsystem while attached to the anchor carrier, with components that provide the additional functionality of the full baseband subsystem powered off. Upon detaching from the anchor carrier and attaching to a data carrier, the wireless device may operate the full baseband subsystem, powering on components that provide the additional functionality of the full baseband subsystem. Once data transfer is complete, the wireless device may again detach from the data carrier and attaching to the anchor carrier, and resume operating the anchor subsystem, including powering off the components that provide the additional functionality of the full baseband subsystem. Such an arrangement may improve the power efficiency of the wireless device's operations, e.g., as the hardware resources powered may be scaled to match the characteristics of the wireless communication carrier(s) currently being used, at least in some instances.

FIGS. 6-9 and Additional Information

FIGS. 6-9 and the following additional information are provided as being illustrative of further considerations and possible implementation details of the method of FIG. 5, and are not intended to be limiting to the disclosure as a whole. Numerous variations and alternatives to the details provided herein below are possible and should be considered within the scope of the disclosure.

Figures 6, 7:
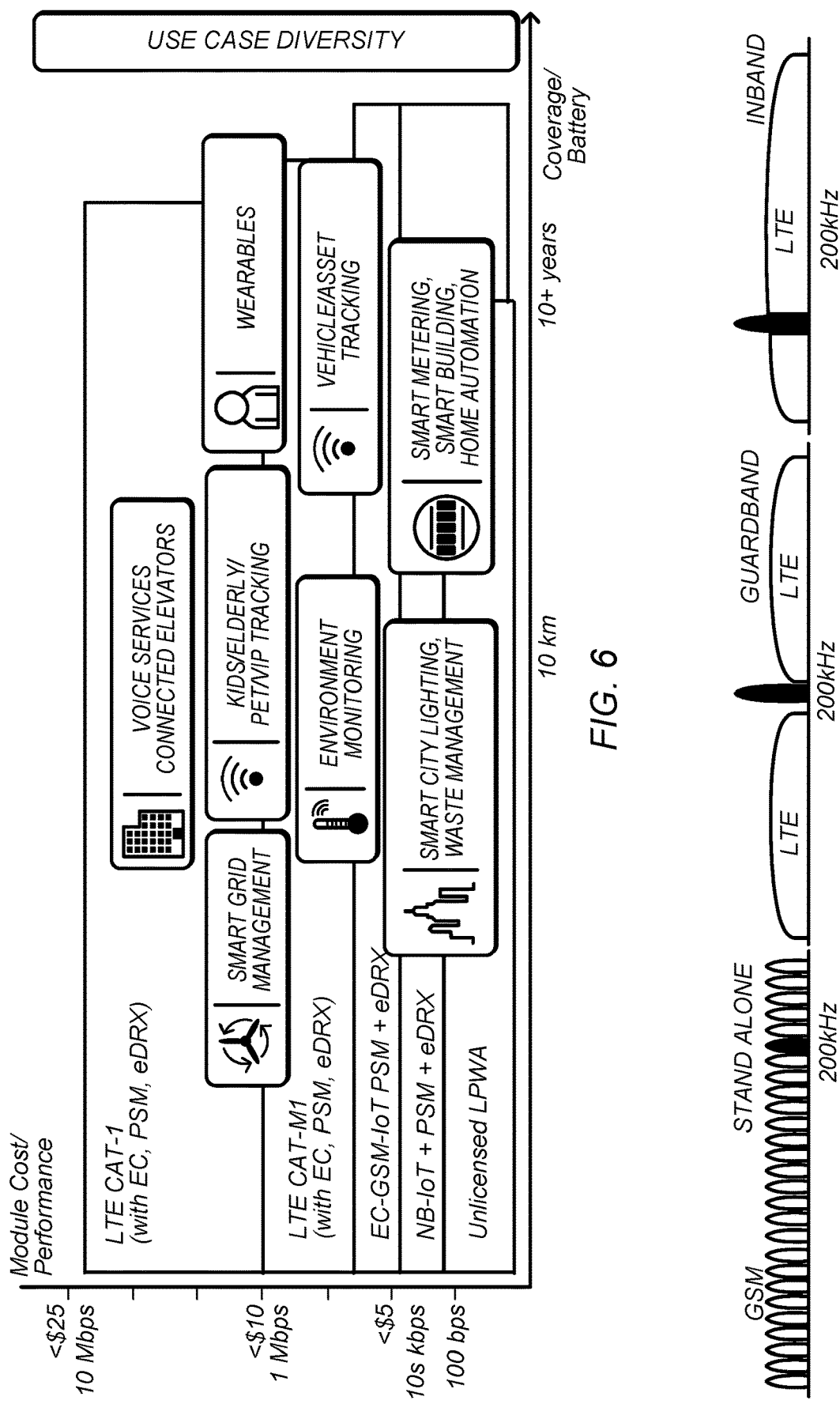
FIG. 6 illustrates a possible range of exemplary wireless communication use cases, including various possible expected cost, performance, coverage, battery, and wireless communication technology characteristics that could be associated with those use cases, according to some embodiments.
FIG. 7 illustrates various possible exemplary NB-IoT carrier deployment modes, according to some embodiments.

FIG. 6 illustrates a variety of exemplary possible current and future wireless communication use cases, according to some embodiments. As shown, the various illustrated use cases may be expected, at least according to some embodiments, to utilize a range of wireless communication technologies and communication categories, with various expected module costs, throughput capabilities, communication range, and battery lives associated therewith.

Included among the illustrated wireless communication technologies are LTE category 1 (CAT-1) communication, which may include features for any or all of EC, PSM, and/or eDRX; LTE category M1 (CAT-M1) communication, which may also include features for any or all of EC, PSM, and/or eDRX; EC-GSM-IoT communication, which may include features for any or all of PSM and/or eDRX; NB-IoT communication, which may include features for any or all of PSM and/or eDRX; and/or other possible unlicensed low power wide area (LPWA) solutions.

Included among the illustrated wireless communication use cases are voice services for connected elevators, smart grid management, tracking of children/elderly/pets/VIPs/etc., wearable devices, environment monitoring, vehicle/asset tracking, smart city lighting and waste management, smart metering, smart buildings, and home automation.

FIG. 7 illustrates a variety of exemplary posssible NB-IoT carrier deployment modes, according to some embodiments. The illustrated deployment modes include standalone deployments (e.g., in a repurposed GSM band), guardband deployments (e.g., in a guardband frequency between LTE carriers), and inband deployments (e.g., within an LTE carrier). In any of these possible deployment modes, NB-IoT carriers may include a variety of key features. For example, among various possible characteristics, NB-IoT carriers may support peak rates of approximately 20 kbps in the downlink and 60 kbps in the uplink; single tone (e.g., 3.75 KHz vs. 15 KHz) and multi tone uplink modulation may be used; single antenna, half duplex frequency division duplexing may be used; and/or a per-UE carrier bandwidth of 180 KHz may be used, according to some embodiments. As further possible example radio access network (RAN)/evolved packet core (EPC) features, NB-IoT carriers may include mandatory data over non-access stratum (DoNAS) support, optional radio resource control (RRC) suspend/resume support, eDRX support, and multi-physical resource block (PRB) support, according to some embodiments. Note that for multi-PRB support embodiments, a UE may still operate on one PRB at a time, at least according to some embodiments. Such multi-PRB support may include assignment through RRC signaling and may additionally only be used for inband and guardband deployments, at least in some instances. In some instances, NB-IoT carriers may provide coverage enhancement features for supporting coverage up to 20 dB.

As previously discussed with respect to FIG. 6, there are many existing and developing wireless communication technologies designed to support a variety of wireless communication use cases. The various carriers supported by these wireless communication technologies are generally each designed to fill a specific wireless communication use case or set of use cases, however, with the variety and rapid evolution of wireless communication needs, there are, in at least some instances, gaps between the features provided and the ideal feature sets for certain use cases.

Figure 8:
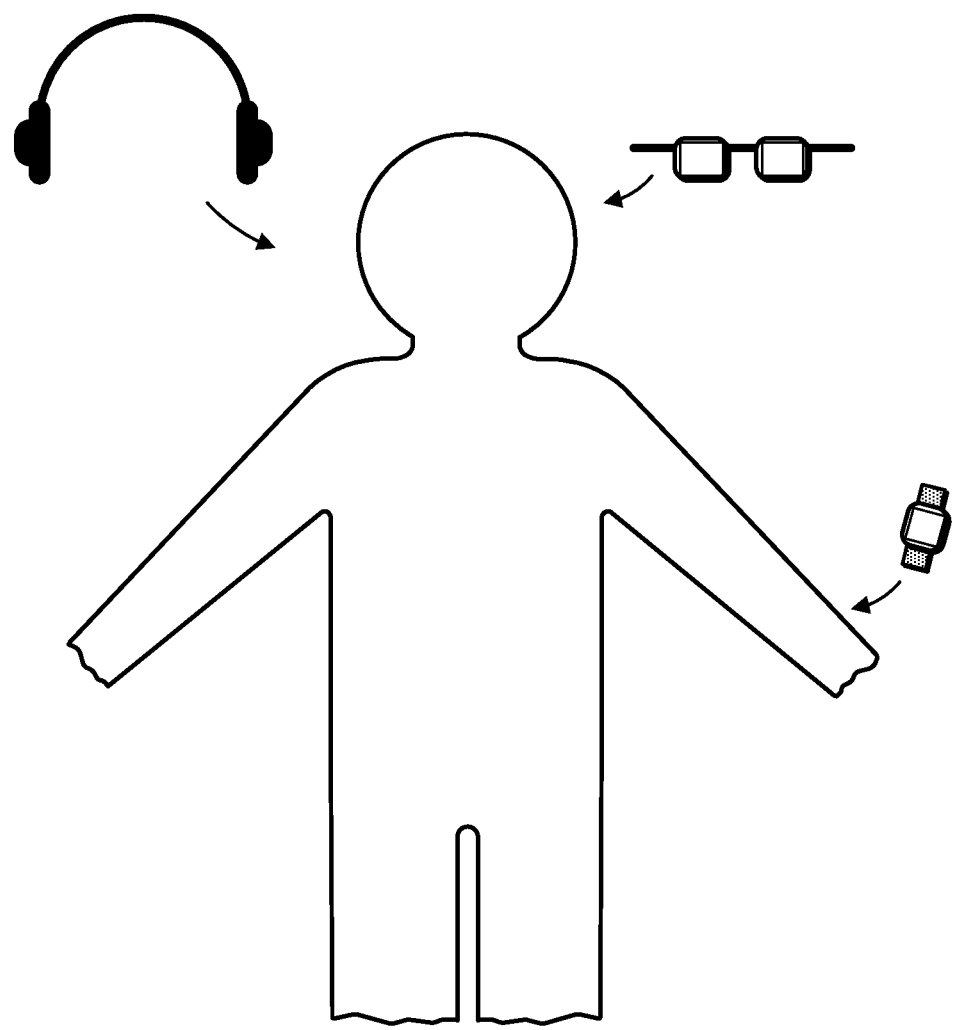
FIG. 8 illustrates a variety of exemplary wearable and other wireless device use cases, according to some embodiments.

For example, consider the "wearables" category of wireless communication uses. A variety of examples of possible wireless devices that might be considered within this category are illustrated in FIG. 8, according to some embodiments. The illustrated examples can include tracking devices, watches, glasses, headphones, paging devices, home or vehicle control devices, etc. For at least some such devices, support for occasional or regular medium or high data rate exchanges, real-time (e.g., voice) services, and/or other features may be desirable, with relatively power efficient/low battery consumption operation also desired, but without the need for very low complexity, very low power consumption operation. 3GPP Release 13 category M1 (eMTC) communication may address some of these features but not others; for example, it may offer limited bandwidth, and may generally be optimized for background/non-real-time services (e.g., non-voice). 3GPP Release 14 category A (FeMTC) communication is under development and may address some of these features, but may still leave some portion of the wearables category with suboptimal support. 3GPP release 13 category NB1 may also address some of the desired features for this category of use cases, including potentially providing support for very low complexity and power consumption operation, but may offer extremely limited bandwidth and data rates (e.g., including having a limited concept of a data radio bearer), and may exhibit a lack of flexibility, for example with respect to opportunistic mobility to other RATs. A NB-IoT based solution for addressing the gaps in category NB1 to support the interactive/background oriented wearable use case may provide a natural bridge between existing and future wireless communication technologies (e.g., between 3GPP release 14 and release 16 massive MTC (mMTC) support), according to some embodiments.

Such a NB-IoT based solution may provide flexibility through the concept of an anchor carrier. For example, the main connection to the network may be referred to as the anchor carrier and may be based on a NB-IoT carrier, e.g., in standalone mode. The anchor carrier may allow a UE to attach to the network and to operate basic functions such as establishing a context (NAS), establishing an RRC connection, etc. The anchor carrier may also be used for providing basic common and broadcast messages (e.g., system information (SI), synchronization signals, etc.). The anchor carrier may also be used to decode a control channel (such as a physical downlink control channel (PDCCH) or a modified version thereof, or another type of control channel), for example for data scheduling and transfer. In some instances, e.g., in order not to burden the PDCCH of the anchor carrier, it could be envisioned that the anchor carrier generally only provides basic information about the data carrier (e.g., waveform information, bandwidth information, etc., for the data carrier). Once a UE is connected to the data carrier, a control channel provided via the data carrier may be decoded by the UE to get the resource assignment for the UE.

The anchor carrier may be deployed in licensed or unlicensed spectrum. According to some embodiments, the anchor carrier may not be used for data transfer (e.g., potentially except for legacy or otherwise limited NB-IoT devices that do not support the anchor carrier/data carrier framework).

Depending on the class of the service/application, or of the device, among various possibilities, the anchor carrier may schedule data transfer opportunistically in a time division multiplexing (TDM) fashion on a different carrier (the data carrier), which could be any of a NB-IoT carrier (e.g., inband or guardband), a FeMTC carrier, a 5G waveform/allocation, or any of various other possible data carriers.

Figure 9:
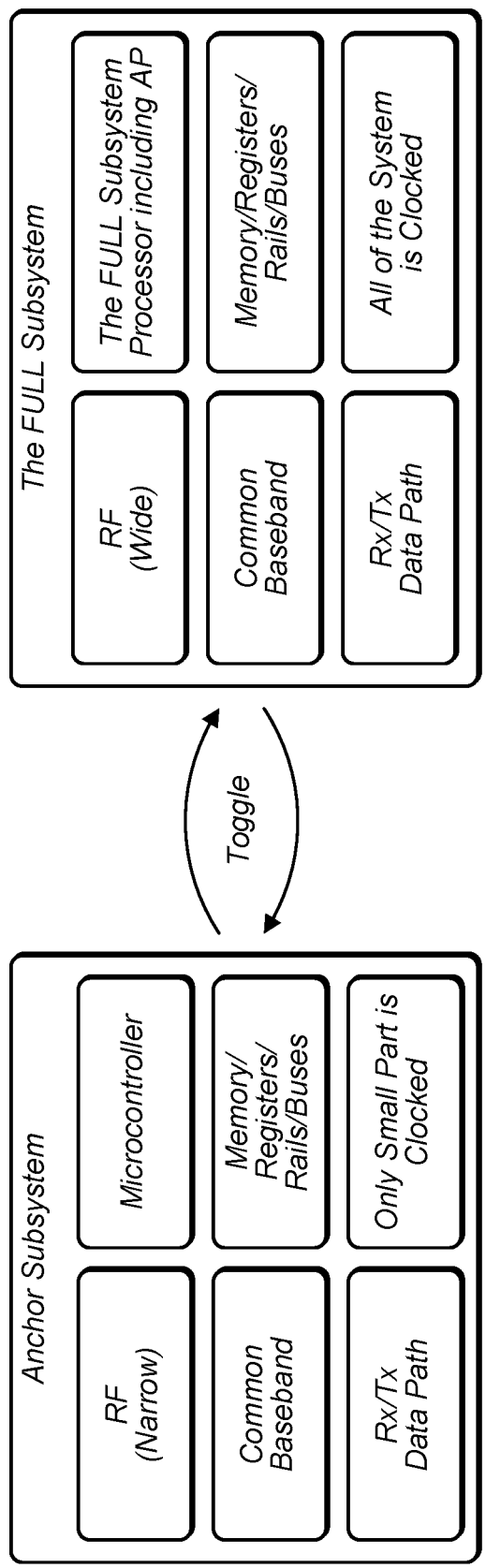
FIG. 9 illustrates an exemplary possible system view of a wireless device capable of performing wireless communication using an anchor carrier and data carriers, according to some embodiments.

Such an anchor concept may allow for an optimized and power efficient implementation, at least according to some embodiments. For example, a wireless device may be designed to include readily scalable hardware and/or software resources, such that a slim modem designed for the characteristics of the anchor carrier (e.g., a 200 KHz modem for an NB-IoT anchor carrier) can generally be on, with additional resources available on-demand if higher powered and/or wider band communication is scheduled. For example, a system design including a full subsystem and an anchor subsystem, such as illustrated in FIG. 9, could be used in conjunction with a wireless communication system that utilizes anchor carriers and data carriers such as described herein. In the illustrated system of FIG. 9, the anchor subsystem may include narrowband radio frequency components, a microcontroller, certain common baseband (e.g., broadcast channel, paging channel) modules, a set of memories/registers/rails/buses, and a transmit/receive data path. When the anchor subsystem is in use, only a subset (e.g., a small part) of the wireless device baseband components may be clocked. The anchor subsystem may be used when no data is being exchanged and the wireless device is attached to the anchor carrier. When data is available, the wireless device may release/detach from the anchor/master carrier and attach to the data/slave carrier, including toggling/switching to use of the full subsystem. The full subsystem may include radio frequency components capable of supporting wideband communication, a full subsystem processor (potentially including bringing online an application processor of the wireless device), the common baseband modules, a set of memories/registers/rails/buses (which may be more extensive than those included in the anchor subsystem), and a transmit/receive data path. When the full subsystem is in use, all of the wireless device baseband components may be clocked. When data communication is finished, the wireless device may release/detach from the data/slave carrier and attach back to the anchor/master carrier, including toggling/switching back to the anchor subsystem.

Note that the anchor/data carrier concept described herein may be extended as a flexible framework for supporting a wide range of device types beyond just wearable device use cases, potentially including extending into lower complexity devices and/or higher complexity devices (e.g., for LTE systems). For example, an inband/guardband anchor could be used as a notification to a UE, for example as an indication of the presence of a paging or a UE dedicated PDCCH, and/or used by the UE in the uplink for any "keep-alive" messages (e.g., with the use of DoNAS), potentially allowing for reduced power consumption during idle-mode timelines when little or no data exchange is occurring.

As another possibility, a module supporting the anchor/data carrier concept described herein may be included in various devices to provide other efficient types of communication capability, for example for direct link communication.

In the following further exemplary embodiments are provided.

One set of embodiments may include a method, comprising, by a wireless device: attaching to a cellular network via an anchor carrier; receiving data transfer scheduling information from the cellular network via the anchor carrier, wherein the data transfer scheduling information indicates a data carrier on which data transfer is scheduled; and receiving data via the data carrier.

Another set of embodiments may include a method, comprising: by a cellular base station: providing an anchor carrier; establishing context information with a wireless device via the anchor carrier; and providing data transfer scheduling information to the wireless device via the anchor carrier, wherein the data transfer scheduling information indicates a data carrier on which data transfer is scheduled.

According to some embodiments, the data carrier is selected from a plurality of types of carrier.

According to some embodiments, a carrier type of the data carrier is selected based at least in part on one or more of a device category of the wireless device or a data type of the data.

According to some embodiments, a carrier type of the data carrier is selected from one of: a narrowband internet of things (NB-IoT) carrier; a further enhancements to machine type communication (FeMTC) carrier; or a third generation partnership project (3GPP) fourth generation (4G) or fifth generation (5G) carrier.

According to some embodiments, the anchor carrier provides control plane functions, wherein the data carrier provides data plane functions.

According to some embodiments, the data transfer scheduling information comprises waveform and bandwidth information for the data carrier, wherein the data transfer scheduling information does not comprise resource assignment information for the data carrier, wherein the method further comprises: the wireless device receiving resource assignment information for the data transfer via the data carrier.

According to some embodiments, the method further comprises: the wireless device toggling between operating an anchor baseband subsytem and operating a full baseband subsystem based at least in part on whether the wireless device is attached to the anchor carrier or attached to a data carrier, wherein the full baseband subsystem comprises additional functionality that is powered off when operating the anchor baseband subsystem.

According to some embodiments, the method further comprises: the wireless device detaching from the anchor carrier and attaching to the data carrier based on the data transfer scheduling information; and the wireless device detaching from the data carrier and attaching to the anchor carrier after the data transfer is complete while IP data continuity is maintained.

According to some embodiments, the anchor carrier comprises a narrowband internet of things (NB-IoT) carrier.

A still further exemplary set of embodiments may include an apparatus, comprising a processing element configured to cause a device to implement any or all parts of the preceding examples.

Another exemplary set of embodiments may include a wireless device, comprising: an antenna; a radio coupled to the antenna; and a processing element operably coupled to the radio, wherein the device is configured to implement any or all parts of the preceding examples.

A yet further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   a processing element configured to cause a wireless device to:
   attach to a cellular network via an anchor carrier, wherein the anchor carrier comprises a narrowband internet of things (NB-IoT) carrier, wherein attaching to the cellular network comprises providing an indication of a 3$^{rd}$ Generation Partnership Project (3GPP) device category of the wireless device to the cellular network,
   receive control information from the cellular network via the anchor carrier, wherein the control information indicates a data carrier, wherein a data carrier type of the data carrier is selected from a plurality of possible data carrier types, wherein the data carrier type of the data carrier is selected to have a wider bandwidth than the anchor carrier based at least in part on the 3GPP device category of the wireless device; and
   receive data via the data carrier.

2. The apparatus of claim 1, wherein the processing element is further configured to cause the wireless device to:
   provide an indication of one or more of a service type, application type, or data type for a data transfer to the cellular network, wherein a data carrier type of the data carrier is selected based at least in part on the indication of one or more of the service type, application type, or data type for the data transfer, wherein the data carrier type of the data carrier is further selected based at least in part on one or more carrier link metrics for the data carrier.

3. The apparatus of claim 1,
wherein the data carrier comprises a different type of carrier than the anchor carrier.

4. The apparatus of claim 1,
wherein the anchor carrier provides control plane functions,
wherein the data carrier provides data plane functions.

5. The apparatus of claim 1, wherein the control information comprises waveform and bandwidth information for the data carrier, wherein the control information does not comprise resource assignment information for the data carrier, wherein the processing element is further configured to cause the wireless device to:
receive resource assignment information for the data via the data carrier,
wherein the data is received via resources of the data carrier indicated in accordance with the resource assignment information.

6. The apparatus of claim 1, wherein the processing element is further configured to cause the wireless device to:
toggle between operating an anchor baseband subsystem and operating a full baseband subsystem based at least in part on whether the wireless device is attached to the anchor carrier or attached to a data carrier,
wherein the full baseband subsystem comprises additional functionality that is powered off when operating the anchor baseband subsystem.

7. The apparatus of claim 1, wherein the processing element is further configured to cause the wireless device to:
transition from the anchor carrier to the data carrier based at least in part on the control information; and
transition from the data carrier to the anchor carrier after a data transfer is complete.

8. A method, comprising:
by a wireless device:
attaching to a cellular network via an anchor carrier, wherein attaching to the cellular network comprises providing an indication of a $3^{rd}$ Generation Partnership Project (3GPP) device category of the wireless device to the cellular network;
providing an indication of one or more of a service type, application type, or data type for a requested data transfer to the cellular network via the anchor carrier;
receiving data transfer scheduling information from the cellular network via the anchor carrier, wherein the data transfer scheduling information indicates a data carrier on which the requested data transfer is scheduled, wherein a carrier type of the data carrier is selected based at least in part on the indication of one or more of the service type, application type, or data type for the requested data transfer, wherein the carrier type of the data carrier is selected further based at least in part on the 3GPP device category of the wireless device, and wherein the data carrier has a wider bandwidth than the anchor carrier; and
receiving data of the requested data transfer via the data carrier.

9. The method of claim 8, wherein the method further comprises:
operating an anchor baseband subsystem while attached to the anchor carrier;
detaching from the anchor carrier based at least in part on the data transfer scheduling information;
attaching to the data carrier based at least in part on the data transfer scheduling information; and
operating a full baseband subsystem while attached to the data carrier,
wherein the full baseband subsystem comprises additional functionality relative to the anchor baseband subsystem that is powered off when operating the anchor baseband subsystem.

10. The method of claim 9, wherein the method further comprises:
detaching from the data carrier after a data transfer is complete;
attaching to the anchor carrier after the data transfer is complete; and
resuming operating the anchor baseband subsystem based on detaching from the data carrier and attaching to the anchor carrier, comprising powering off the additional functionality of the full baseband subsystem relative to the anchor baseband subsystem.

11. A cellular base station, comprising:
an antenna;
a radio operably coupled to the antenna; and
a processing element operably coupled to the radio;
wherein the antenna, radio, and processing element are configured to:
provide an anchor carrier, wherein the anchor carrier comprises a narrowband internet of things (NB-IoT) carrier;
establish context information with a wireless device via the anchor carrier, wherein establishing context information with the wireless device comprises receiving an indication of a $3^{rd}$ Generation Partnership Project (3GPP) device category from the wireless device;
select a carrier type of the data carrier based at least in part on the 3GPP device category of the wireless device; and
provide data transfer scheduling information to the wireless device via the anchor carrier, wherein the data transfer scheduling information indicates a data carrier on which a data transfer is scheduled, and wherein the data carrier has a wider bandwidth than the anchor carrier.

12. The cellular base station of claim 11, wherein the antenna, radio, and processing element are further configured to:
release the wireless device from the anchor carrier after providing the data transfer scheduling information to the wireless device, wherein context information for the wireless device is retained while the anchor carrier is released; and
provide data to the wireless device via the data carrier.

13. The cellular base station of claim 11,
wherein the data carrier is selected from a plurality of types of carrier.

14. The cellular base station of claim 11, wherein the antenna, radio, and processing element are further configured to:
select a carrier type of the data carrier further based at least in part on a data type of the data transfer.

15. The cellular base station of claim 11,
wherein a carrier type of the data carrier is selected from one of:
a narrowband internet of things (NB-IoT) carrier;
a further enhancements to machine type communication (FeMTC) carrier; or a third generation partnership project (3GPP) fourth generation (4G) or fifth generation (5G) carrier.

16. The cellular base station of claim 11,
wherein the anchor carrier provides control plane functions,
wherein the data carrier provides data plane functions.

17. The cellular base station of claim 11,
wherein the data transfer scheduling information comprises waveform and bandwidth information for the data carrier, wherein the data transfer scheduling information does not comprise resource assignment information for the data carrier, wherein the cellular base station is further configured to:
provide resource assignment information for the data transfer to the wireless device via the data carrier.

18. The method of claim 8, wherein the carrier type of the data carrier is selected from one of:
a narrowband internet of things (NB-IoT) carrier;
a further enhancements to machine type communication (FeMTC) carrier; or
a third generation partnership project (3GPP) fourth generation (4G) or fifth generation (5G) carrier.

19. The method of claim 8,
wherein the anchor carrier provides control plane functions,
wherein the data carrier provides data plane functions.

20. The method of claim 8,
wherein the data transfer scheduling information comprises waveform and bandwidth information for the data carrier, wherein the data transfer scheduling information does not comprise resource assignment information for the data carrier, wherein the method further comprises:
receiving resource assignment information for the data via the data carrier, wherein the data is received via resources of the data carrier indicated in accordance with the resource assignment information.

* * * * *